US012716529B2

(12) United States Patent
Khalkar et al.

(10) Patent No.: US 12,716,529 B2
(45) Date of Patent: Aug. 25, 2026

(54) EMT COMPRESSION SLIDE OVER COUPLING THREE PIECE ASSEMBLY

(71) Applicant: Eaton Intelligent Power Limited, Dublin (IE)

(72) Inventors: Amol Anil Khalkar, Pune (IN); Rajendra Vishwanath Pawar, Tal Miraj (IN); Hemraj Keda Thorat, Pune (IN); Tushar Krishna Dandekar, Pune (IN); Tarade Sujit Prabhakar, Ahmednagar (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 44 days.

(21) Appl. No.: 18/522,705

(22) Filed: Nov. 29, 2023

(65) Prior Publication Data

US 2024/0175529 A1 May 30, 2024

(30) Foreign Application Priority Data

Nov. 30, 2022 (IN) ............................ 202211068917

(51) Int. Cl.
*F16L 19/08* (2006.01)
*F16L 37/092* (2006.01)
*H02G 3/04* (2006.01)

(52) U.S. Cl.
CPC ......... *F16L 19/083* (2013.01); *F16L 37/0925* (2013.01); *H02G 3/0475* (2013.01)

(58) Field of Classification Search
CPC ..... F16L 19/083; F16L 19/10; F16L 37/0925; H02G 3/065; H02G 3/066
See application file for complete search history.

(56) References Cited

U.S. PATENT DOCUMENTS

| | | | | |
|---|---|---|---|---|
| 1,843,202 | A * | 2/1932 | Buchanan | F16L 19/083 |
| 6,670,553 | B1 | 12/2003 | Gretz | |
| 6,832,790 | B2 | 12/2004 | Olson | |
| 6,957,968 | B1 | 10/2005 | Gretz | |
| 7,220,923 | B1 | 5/2007 | Sheehan et al. | |
| 7,390,980 | B1 | 6/2008 | Gretz | |
| 9,857,008 | B2 | 1/2018 | Swift et al. | |
| 10,056,746 | B1 | 8/2018 | Smith | |
| 10,847,962 | B2 | 11/2020 | Casanova | |
| 11,079,046 | B2 | 8/2021 | Trivett et al. | |
| 11,322,919 | B2 | 5/2022 | Pineaud et al. | |
| 2007/0252388 | A1 * | 11/2007 | Ochiai | F16L 19/10 |
| 2008/0136175 | A1 * | 6/2008 | Hansen | F16L 19/10 |
| 2017/0201078 | A1 | 7/2017 | Smith | |

FOREIGN PATENT DOCUMENTS

WO WO-2006135227 A1 * 12/2006 .......... F16L 37/0925

* cited by examiner

*Primary Examiner* — Zachary T Dragicevich
(74) *Attorney, Agent, or Firm* — Stinson LLP

(57) ABSTRACT

A compression coupler assembly including a first compression nut, a second compression nut threadably attached to the first compression nut and an inner sleeve configured to be captured between the first compression nut and the second compression nut when threaded together. The inner sleeve including a tubular-shaped body with a longitudinal slit extending through a wall of the body between opposite ends of the body. An inwardly slopped flange is formed at each end. Each inwardly slopped flange configured to deflect inwardly as the first compression nut and the second compression nut are threaded to a predetermined position. At least one stop protrudes inwardly from an inner wall of the inner sleeve.

13 Claims, 14 Drawing Sheets

62
50
6
6
52

4
4
67
67
64
62
72
50
3
3
52

72
86b
86b
84
98
96
76b
98
96
86a 78b
76b
88
82b
86b
86b
84
92
94
74
86a
76a
82a
84
84
78a
82a
86a
72

114
82b
68
62
114a
96 72
C
C
B
B
116
112a
52
58
82a
112

112a
A
62
A
72
96
52
112

EMT COMPRESSION SLIDE OVER COUPLING THREE PIECE ASSEMBLY

PRIORITY

This application claims the benefit of priority of provisional Indian patent application Ser. No. 202211068917, filed Nov. 30, 2022, the contents of which are incorporated herein by reference in their entirety.

FIELD

The subject application relates to couplers for conduits. More particularly, a compression coupler assembly that includes three components.

BACKGROUND

Compression couplers find particular application in joining two conduits together. The compression coupler exerts a compression force to an outer surface of each conduit to maintain the conduits in a desired position relative to each other.

There is a need for a compression coupler with fewer parts that provides for repeatable and reliable coupling of two conduits together.

The present invention provides a compression coupling assembly that allows a user the ability to quickly and easily coupled two conduits to each other.

SUMMARY OF THE INVENTION

There is provided a compression coupler assembly including a first compression nut, a second compression nut threadably attached to the first compression nut and an inner sleeve configured to be captured between the first compression nut and the second compression nut when threaded together. The inner sleeve including a tubular-shaped body with a longitudinal slit extending through a wall of the body between opposite ends of the body. An inwardly slopped flange is formed at each end. Each inwardly slopped flange configured to deflect inwardly as the first compression nut and the second compression nut are threaded together after contacting the inwardly slopped flanges. At least one stop protrudes inwardly from an inner wall of the inner sleeve.

In the foregoing compression coupler assembly, a tongue extends from an edge of the wall defining one side of the longitudinal slit and a groove is formed in an edge of the wall defining an opposite side of the longitudinal slit. The tongue is configured to slide in the groove when the first and second compression nuts are threaded together after contacting the inwardly slopped flanges.

In the foregoing compression coupler assembly, the longitudinal slit includes a first portion and a second portion that is offset relative to the first portion to define a first tongue at one end of the inner sleeve and a second tongue at an opposite end of the inner sleeve.

In the foregoing compression coupler assembly, the longitudinal slit includes a first portion, a second portion and third portion. The first portion and the third portion are disposed proximate opposite ends of the inner sleeve and offset in opposite circumferential directions from the second portion. The first portion defines a first tongue on one edge of the wall defining one side of the slit and the third portion defines a second tongue on an edge of the wall defining an opposite side of the slit.

In the foregoing compression coupler assembly, the at least one notch is formed in a distal end of the inner sleeve to divide the flange into at least one finger that is configured to deflect inwardly as the first and second compression nuts are threaded together after contacting the inwardly slopped flanges.

In the foregoing compression coupler assembly, the at least one finger includes a tab that is formed by deflecting or bending a portion of the finger radially inward.

In the foregoing compression coupler assembly, at least two stops are formed on a wall of the inner sleeve.

In the foregoing compression coupler assembly, the at least one stop is formed by a tab disposed in an opening formed in the wall of the inner sleeve. The tab is configured to deflect radially outward.

In the foregoing compression coupler assembly, the at least one stop is spherical in shape.

In the foregoing compression coupler assembly, further including an outwardly protruding groove that extends circumferentially about the body of the inner sleeve. The groove dimensioned to receive an o-ring.

In the foregoing compression coupler assembly, further including a flap on one edge of the wall defining one side of the slit. The flap is dimensioned to overlap an edge of the wall that defines an opposite side of the slit.

There is further provided a compression coupler assembly including a first compression nut, a second compression nut threadably attached to the first compression nut and an inner sleeve configured to be captured between the first compression nut and the second compression nut when threaded together. The inner sleeve includes a tubular-shaped body with a longitudinal slit extending through a wall of the body between opposite ends of the body. A tongue protrudes from an edge of the wall defining one side of the longitudinal slit. A mating recess is formed in an edge of the wall defining an opposite side of the longitudinal slit, wherein the tongue is configured to slide in the mating recess when the first and second compression nuts are threaded together after contacting inwardly slopped flanges. An inwardly slopped flange is formed at each end. Each inwardly slopped flange is configured to deflect inwardly as the first compression nut and the second compression nut are threaded together after contacting the inwardly slopped flanges. At least one stop protrudes inwardly from an inner wall of the inner sleeve.

In the foregoing compression coupler assembly, the mating recess is a groove formed in the opposite edge of the wall.

In the foregoing compression coupler assembly, the at least one stop is formed by a tab disposed in an opening formed in the wall of the inner sleeve, the tab configured to deflect radially outward.

In the foregoing compression coupler assembly, the at least one stop is spherical in shape.

DETAILED DESCRIPTION

The following presents a description of the disclosure; however, aspects may be embodied in many different forms and should not be construed as limited to the embodiments set forth herein. Furthermore, the following examples may be provided alone or in combination with one or any combination of the examples discussed herein.

Figures 1, 2:
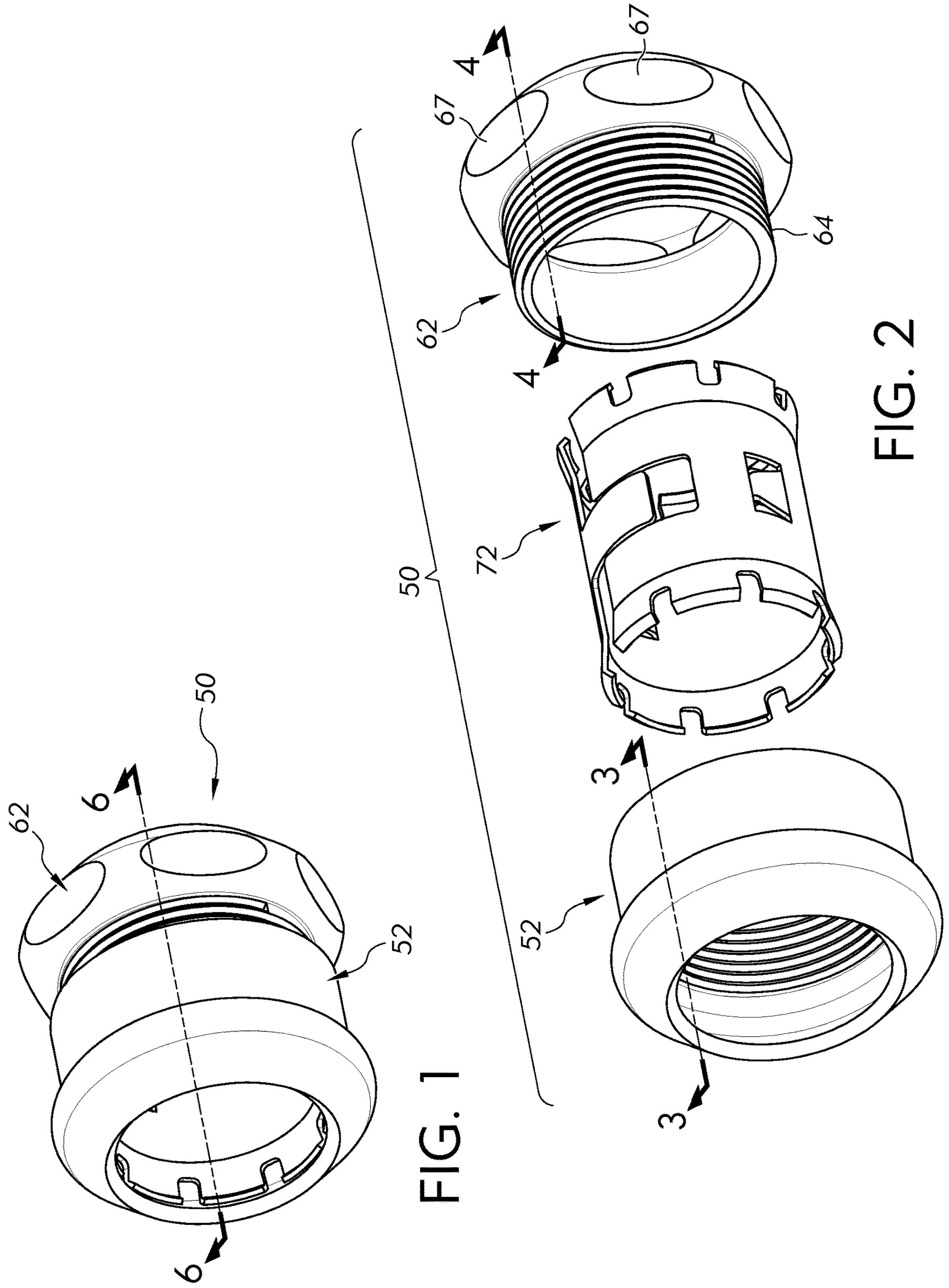
FIG. 1 is a perspective view of an assembled compression coupler assembly.
FIG. 2 is an exploded view of the compression coupler assembly of FIG. 1.

As shown in FIGS. 1 and 2, a compression coupler assembly 50, generally, includes a first compression nut 52, a second compression nut 62 and an inner sleeve 72. The first compression nut 52 and the second compression nut 62 are configured to engage each other via threads to capture the inner sleeve 72 therein.

Figure 3:
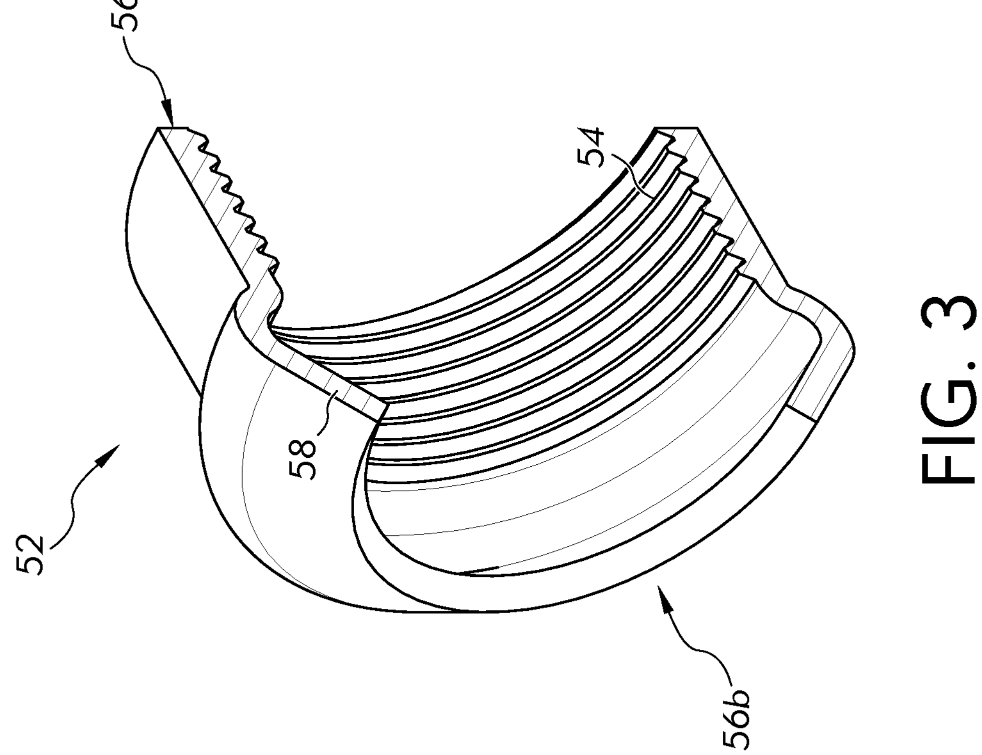
FIG. 3 is a sectioned view of a first compression nut of the compression coupler assembly of FIG. 2 taken along line 3-3.

Referring to FIG. 3, the first compression nut 52 is a tubular-shaped object having an inner thread 54 formed in a first end 56*a*. In the embodiment illustrated, the outer surface of the first compression nut 52 is generally smooth. It is contemplated that flats (not shown) may be formed on the outer surface for allowing a user to grip the first compression nut 52 using a tool, such as a wrench, pliers, etc., so the first compression nut 52 may be rotated about a longitudinal axis thereof. A second end 56*b* of the first compression nut 52 is formed to define an inwardly sloped flange 58 of the first compression nut 52, as described in detail below. In the embodiment illustrated, the first compression nut 52 is a female compression nut.

Figure 4:
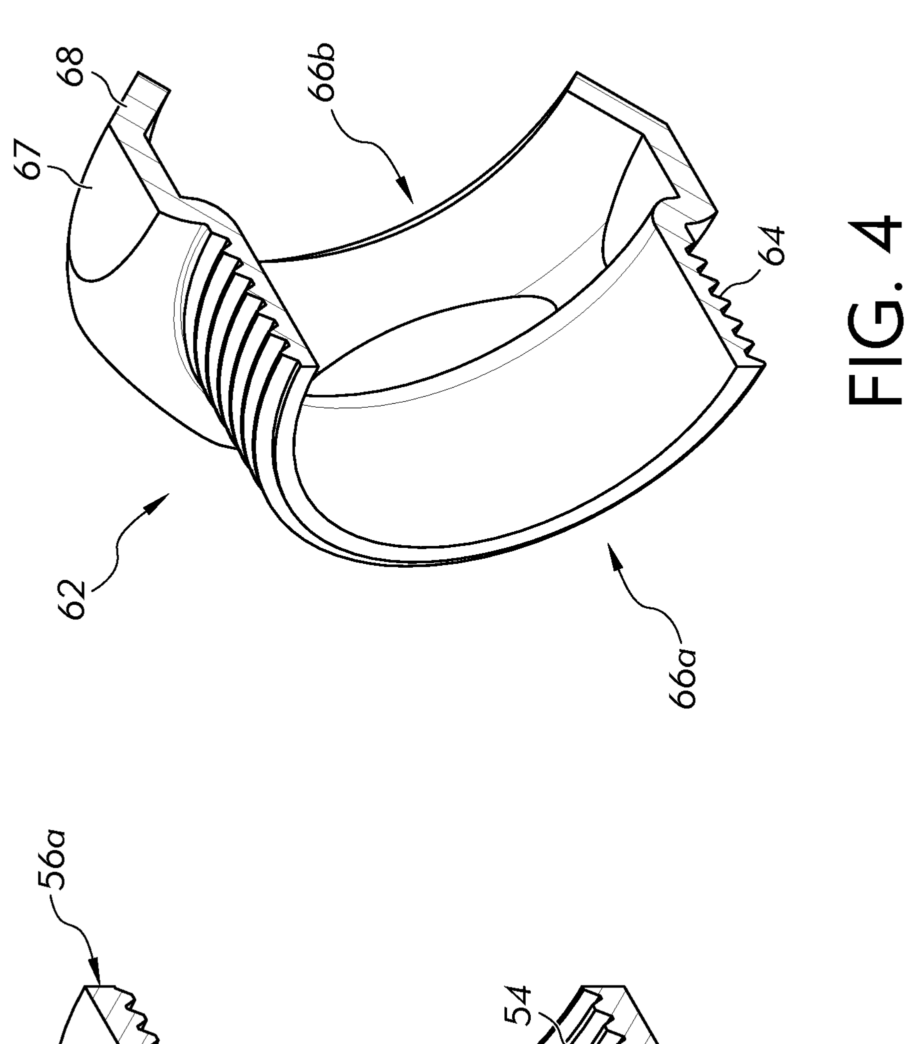
FIG. 4 is a sectioned view of a second compression nut of the compression coupler assembly of FIG. 2 taken along line 4-4.

Referring to FIGS. 2 and 4, the second compression nut 62 is a tubular-shaped object having an external thread 64 formed on a first end 66*a*. In the embodiment illustrated, the outer surface of the second compression nut 62 includes a plurality of flats 67 that are positioned and dimensioned to allow a user to grip the second compression nut 62 using a tool, such as a wrench, pliers, etc., so the second compression nut 62 may be rotated about a longitudinal axis thereof. A second end 66*b* of the second compression nut 62 is formed to define an inwardly sloped flange 68 of the first compression nut 52, as described in detail below. In the embodiment illustrated, the second compression nut 62 is a male compression nut.

Referring to FIGS. 2 and 5A-5D, the inner sleeve 72 is a tubular shaped element having a central portion 74 and outwardly sloped ramp portions 76*a*, 76*b* on a first end 78*a* and a second end 78*b*, respectively. The sloped ramp portions 76*a*, 76*b* terminate in inwardly sloped flanges 82*a*, 82*b*, respectively. A plurality of spaced-apart notches 84 are formed in the first and second ends 78*a*, 78*b* to define a plurality of discrete inwardly sloped fingers 86*a*, 86*b*.

A slit 88 extends through a wall of the inner sleeve 72 and extends between the first end 78*a* and the second end 78*b*. A first edge of the wall the defines one side of the slit 88 is formed to define a tongue 92 that is dimensioned to be received into a mating feature or groove 94 formed in a second edge of the wall that defines an opposite side of the slit 88. The groove 94 is positioned and dimensioned to aligned with the tongue 92. The tongue 92 is dimensioned to slide into the groove 94, as described in detail below.

Figures 5A, 5B:
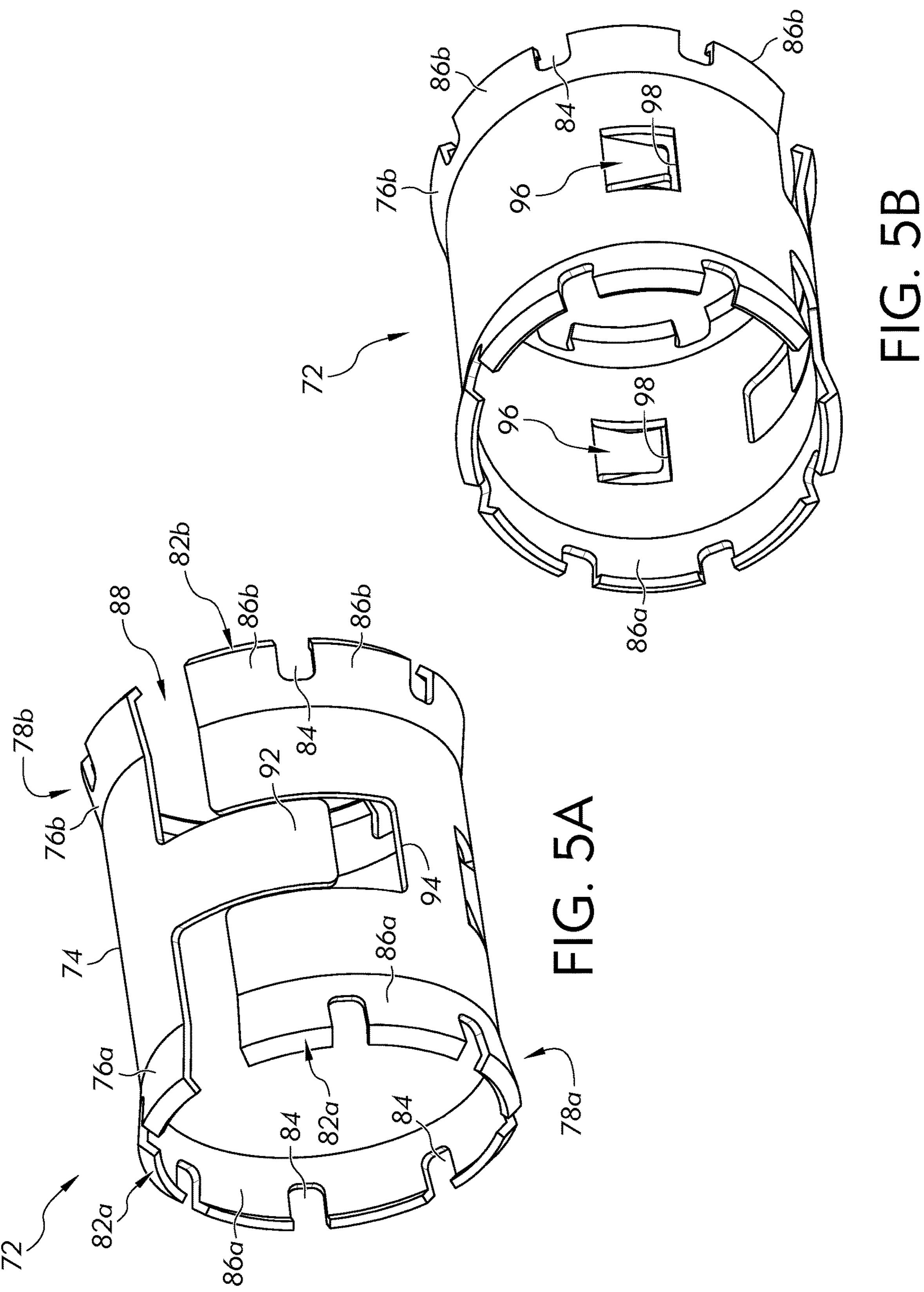
FIG. 5A is a first perspective view of an inner sleeve of the compression coupler assembly of FIG. 2.
FIG. 5B is a second perspective view of an inner sleeve of the compression coupler assembly of FIG. 2.
Figure 5D:
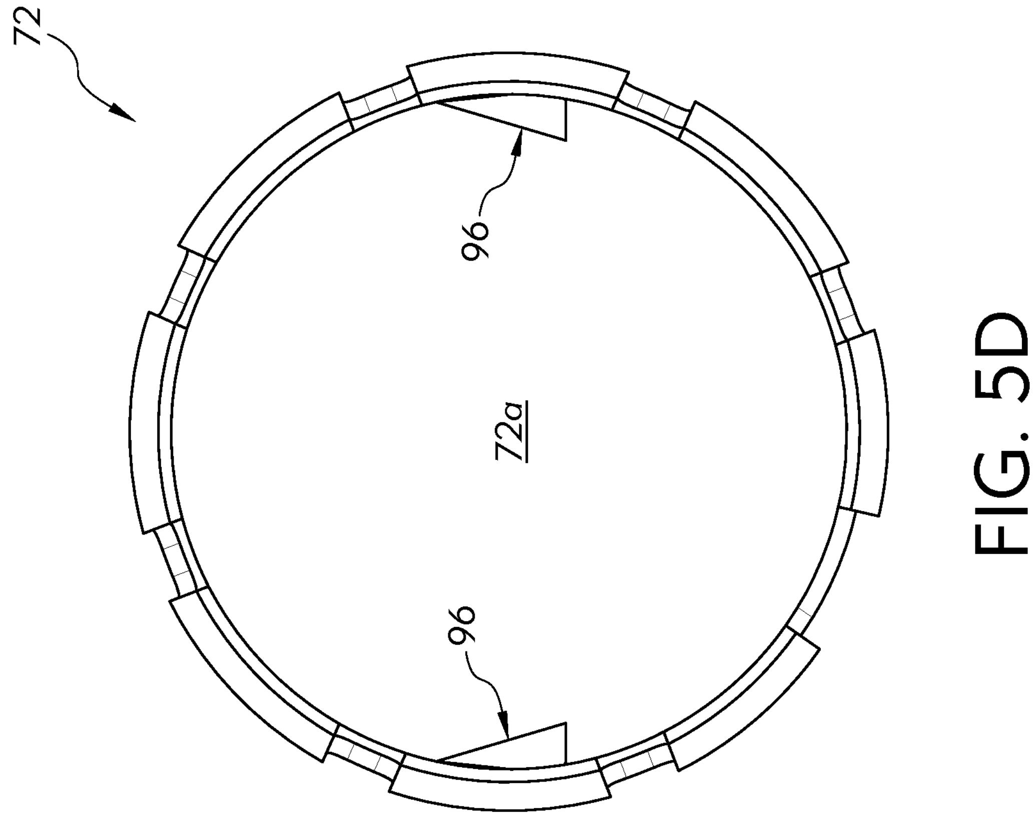
FIG. 5D is an end view of the inner sleeve of the compression coupler assembly of FIG. 2.
Figure 5C:
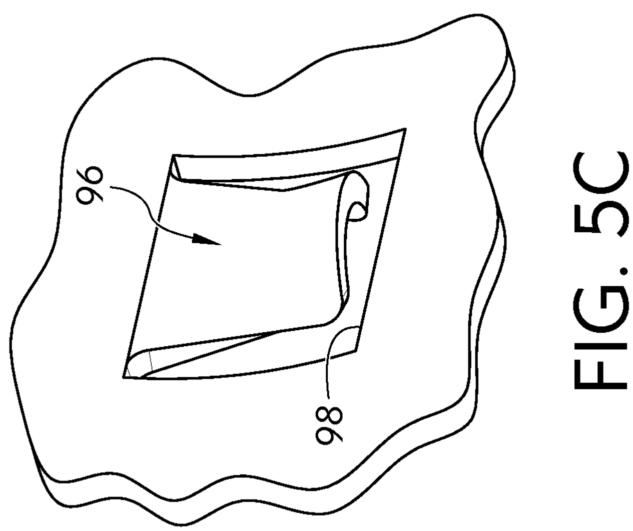
FIG. 5C is an enlarged view of a tab of the inner sleeve of FIG. 5B.

Referring to FIGS. 5B-5D, a tab 96 is provided in an opening 98 formed in the wall of the inner sleeve 72. In the embodiment illustrated, there are two tabs 96 that are disposed diametrically opposite to each other. It is contemplated that the inner sleeve 72 may have more than two tabs 96, e.g., three, four or more tabs, disposed at discrete locations about the periphery of inner sleeve 72. Referring to FIGS. 5C and 5D, the tabs 96 are arcuate-shaped and formed to define ramps that extend into an inner cavity 72*a* of the inner sleeve 72.

Figure 6:
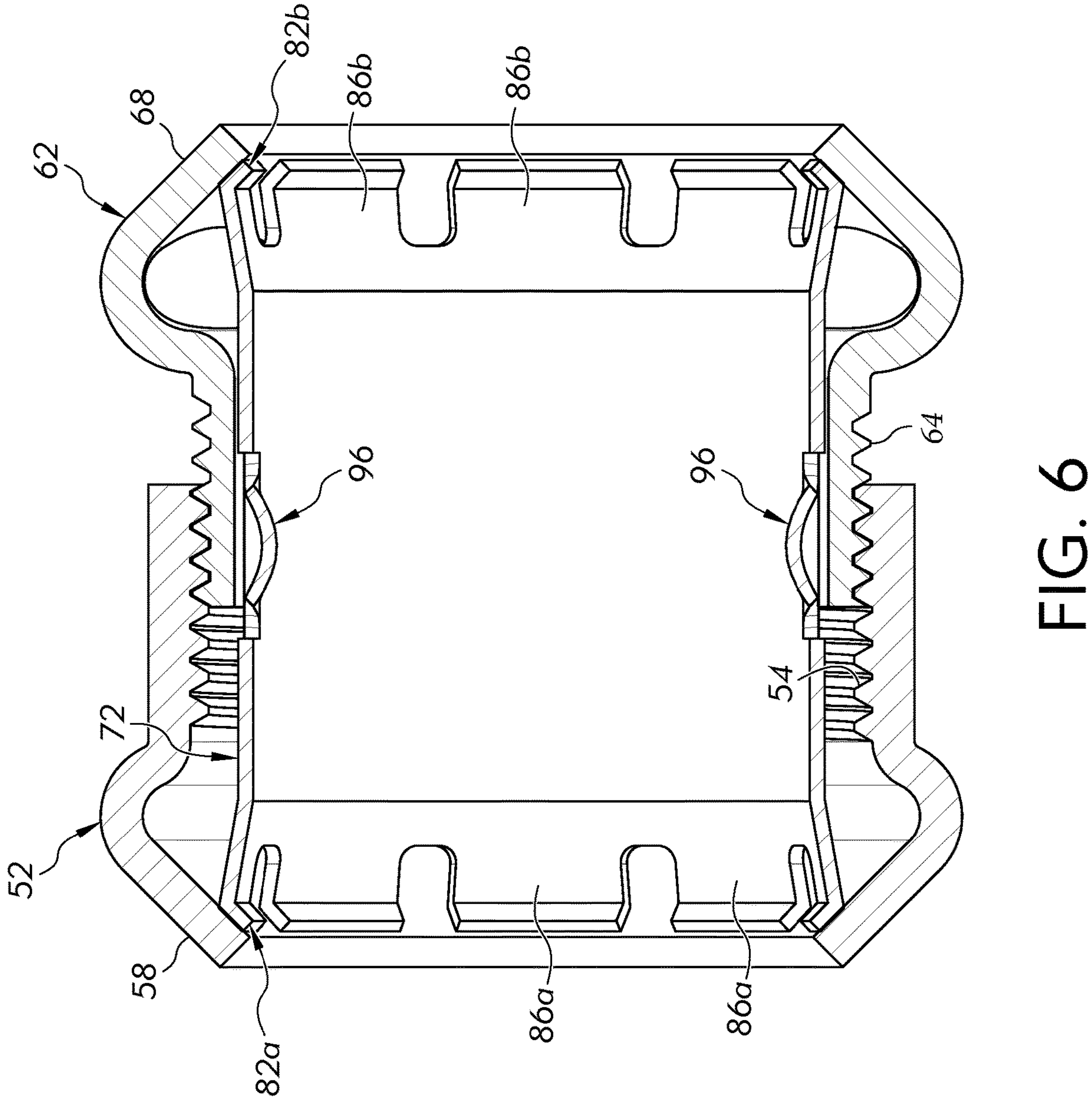
FIG. 6 is a sectioned view of the compression coupler assembly of FIG. 1 taken along line 6-6.

Referring to FIG. 6, the compression coupler assembly 50 may be assembled by placing the inner sleeve 72 within the first compression nut 52 and the second compression nut 62 and threading the first and second compression nuts 52, 62 together. When the first and second compression nuts 52, 62 are threaded together, the inner sleeve 72 is placed such that the flanges 82a, 82b of the fingers 86a, 86b abut the flanges 58, 68 of the first and second compression nuts 52, 62, respectively.

Figures 7A, 7B:
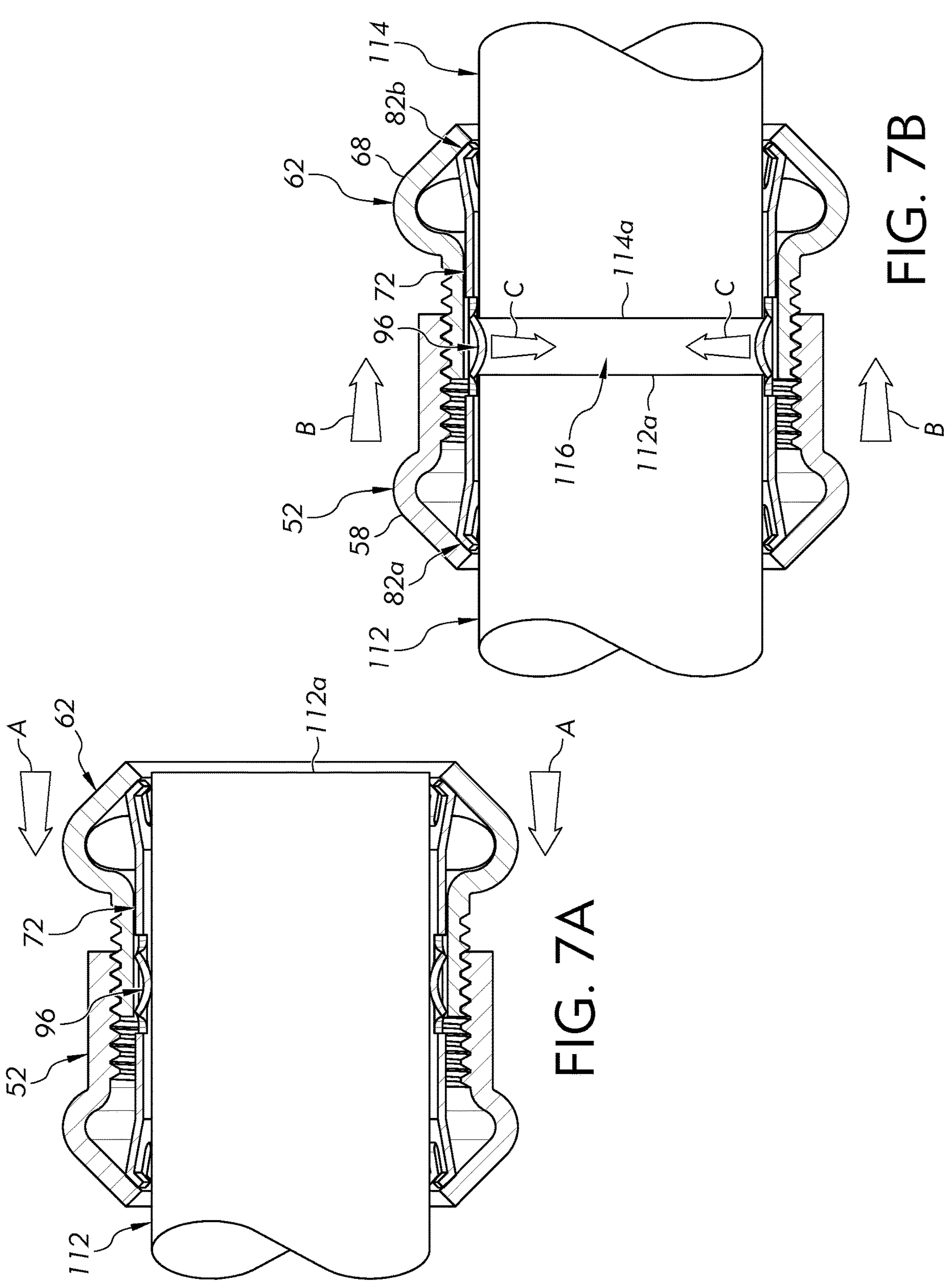
FIG. 7A is a partial sectioned view of the compression coupler assembly of FIG. 1 taken along line 6-6, illustrating the compression coupler assembly attached to a first conduit.
FIG. 7B is a partial sectioned view of the compression coupler assembly of FIG. 1 taken along line 6-6, illustrating the compression coupler assembly attached to two conduits.
Figure 9:
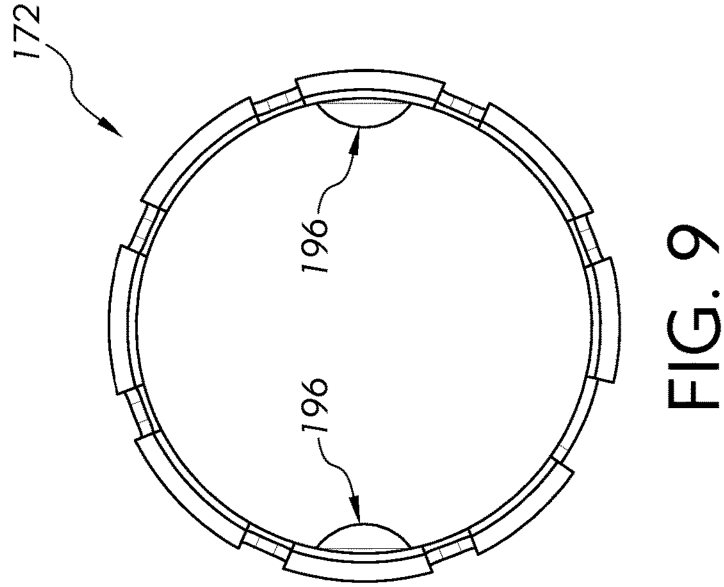
FIG. 9 is an end view of the inner sleeve of FIG. 8.
Figure 8:
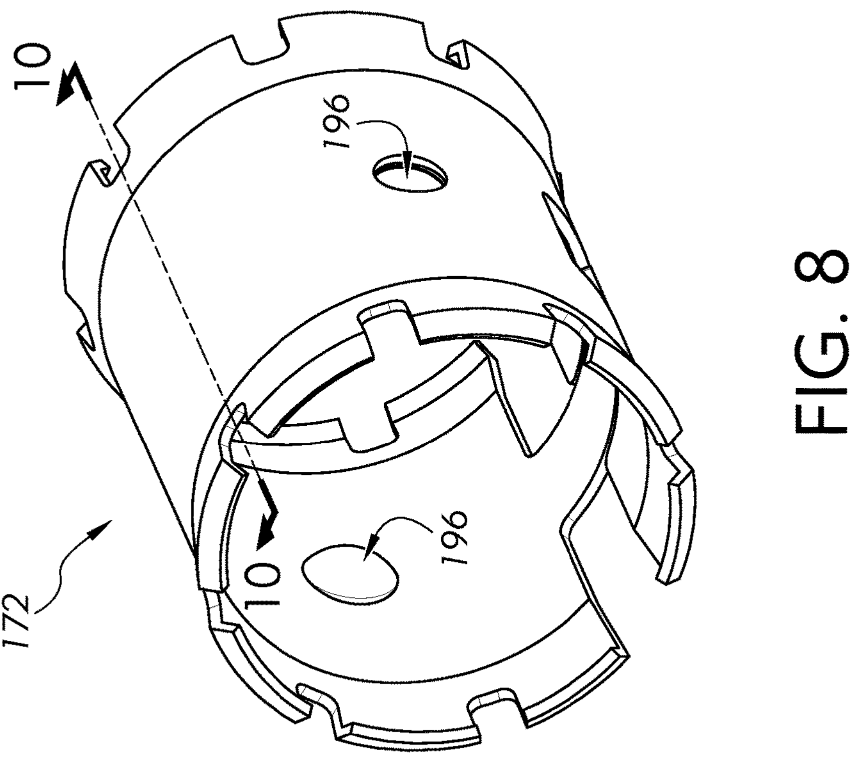
FIG. 8 is a perspective view of a second embodiment of an inner sleeve of the compression coupler assembly of FIG. 2.

Referring to FIG. 7A, the compression coupler assembly 50 is first placed on a first conduit 112 and slides (see arrows A) until the entire compression coupler assembly 50 is on the first conduit 112 and a distal end 112a of the first conduit 112 is accessible. In this position, the tabs 96 flex to allow the first conduit 112 to be received into the compression coupler assembly 50.

Thereafter, a second conduit 114 is positioned adjacent the distal end 112a and the compression coupler assembly 50 slides (see arrows B) towards the second conduit 114. The compression coupler assembly 50 slides until the tabs 96 snap into a gap 116 (in the direction of arrow C) formed between the distal ends 112a, 114a of the first and second conduits 112, 114.

Thereafter, the first and second compression nuts 52, 62 are tightened. As the first and second compression nuts 52, 62 move toward each other the flanges 58, 68 of the first and second compression nuts 52, 62 engage the flanges 82a, 82b of the fingers 86a, 86b and causes them to deflect inwardly toward the outer surface of the first and second conduits 112, 114. The flanges 82a, 82b compress against the outer surface of the first and second conduits 112, 114 thereby securing the compression coupler assembly 50 to the first and second conduits 112, 114. As the flanges 82a, 82b move, the tongue 92 slides in the groove 94 to prevent twisting of the inner sleeve 72. The foregoing assembly is described with respect to inserting the first conduit 112 into the first compression nut 52. It is contemplated that the first conduit 112 may alternatively be inserted into the second compression nut 62 with the assembly being essential the same as described above.

Figures 10A, 10B:
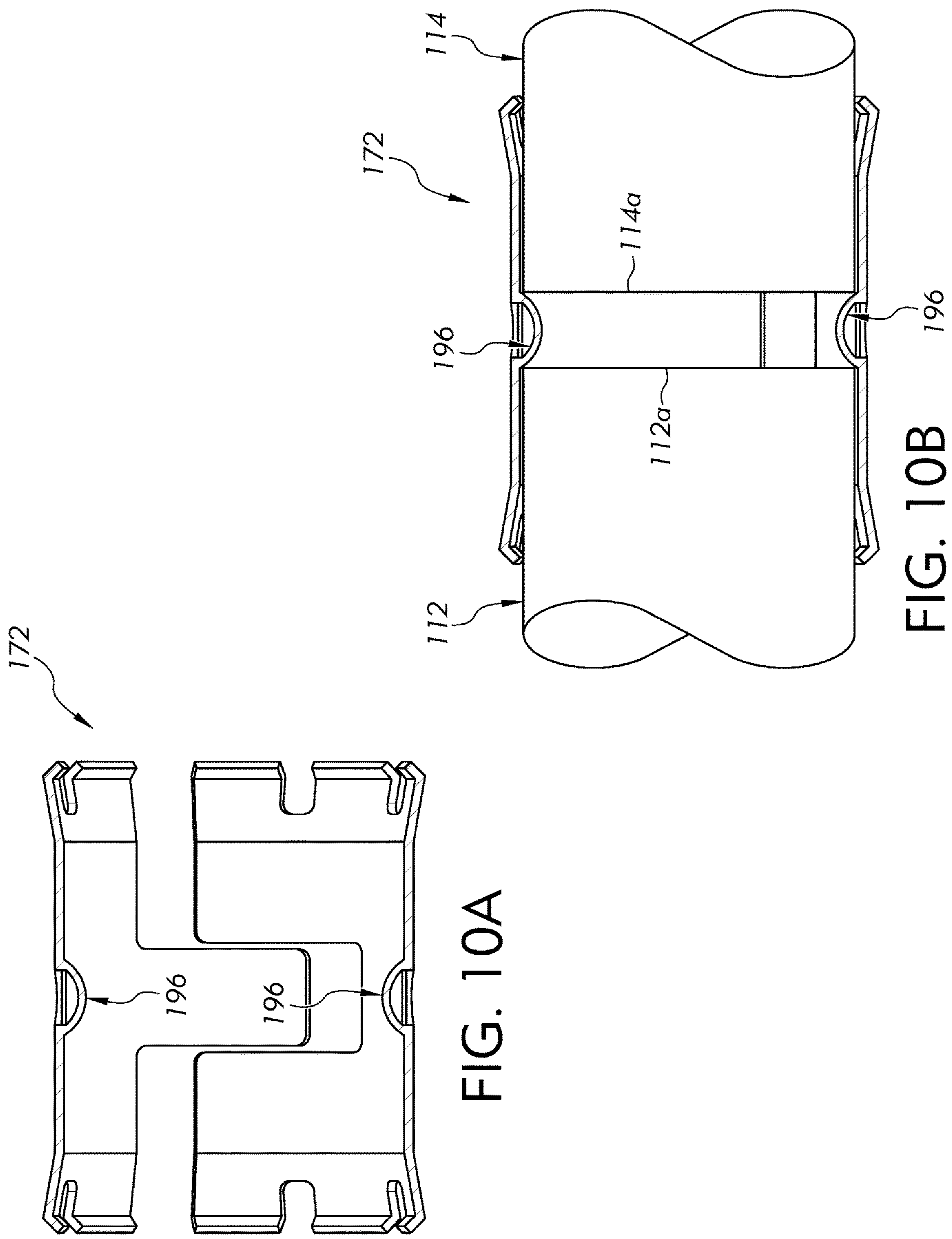
FIG. 10A is a sectioned view of the inner sleeve of FIG. 8 taken alone line 10-10.
FIG. 10B is a sectioned view of the inner sleeve of FIG. 8 taken alone line 10-10, illustrating the inner sleeve attached to two conduits.

According to another embodiment, see FIGS. 8-10B, the inner sleeve 72 is replaced with an inner sleeve 172. The inner sleeve 172 is similar to inner sleeve 72 in most aspects but the tabs 96 are replaced with stops 196. These stops 196, unlike the tabs 96, are not flexible and act as positive stops for the first and second conduits 112, 114. Referring to FIG. 10B, when the first and second conduits 112, 114 are placed in the inner sleeve 172 (for clarity the first and second compression nuts 52, 62 are not shown), the distal ends 112a, 114a of the first and second conduits 112, 114 abut the stops 196 so that the position of the compression coupler assembly 50 on the conduits 112, 114 can be fixed. In the embodiment illustrated, the stops 196 are spherical in shape. It is contemplated that the stops 196 may have other shapes, including but not limited to, rectangular, square, triangular, etc.

Figures 11, 12:
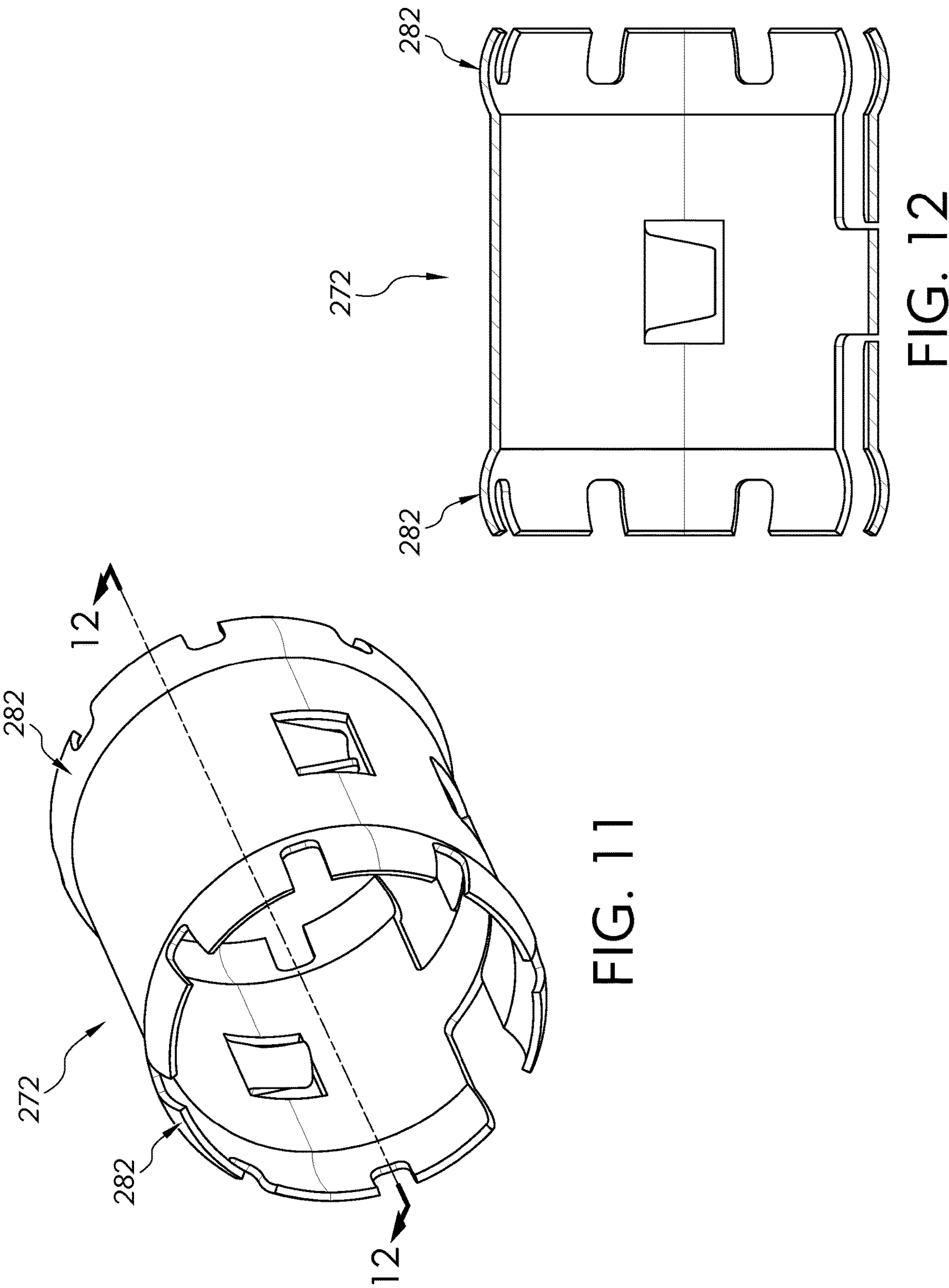
FIG. 11 is a perspective view of a third embodiment of an inner sleeve of the compression coupler assembly of FIG. 2.
FIG. 12 is a sectioned view of the inner sleeve of FIG. 11 taken along line 12-12.

According to yet another embodiment, see FIGS. 11 and 12, an inner sleeve 272 replaces the ramp portions 76a, 76b and the sloped flanges 82a, 82b with arcuate-shaped flanges 282. Similar to the flanges 82a, 82b, the arcuate-shaped flanges 282 are dimensioned to engage and compress against the outer surface of the first and second conduits 112, 114 (FIG. 7B) when the first and second compression nuts 52, 62 (FIG. 7B) are tightened.

Figure 13:
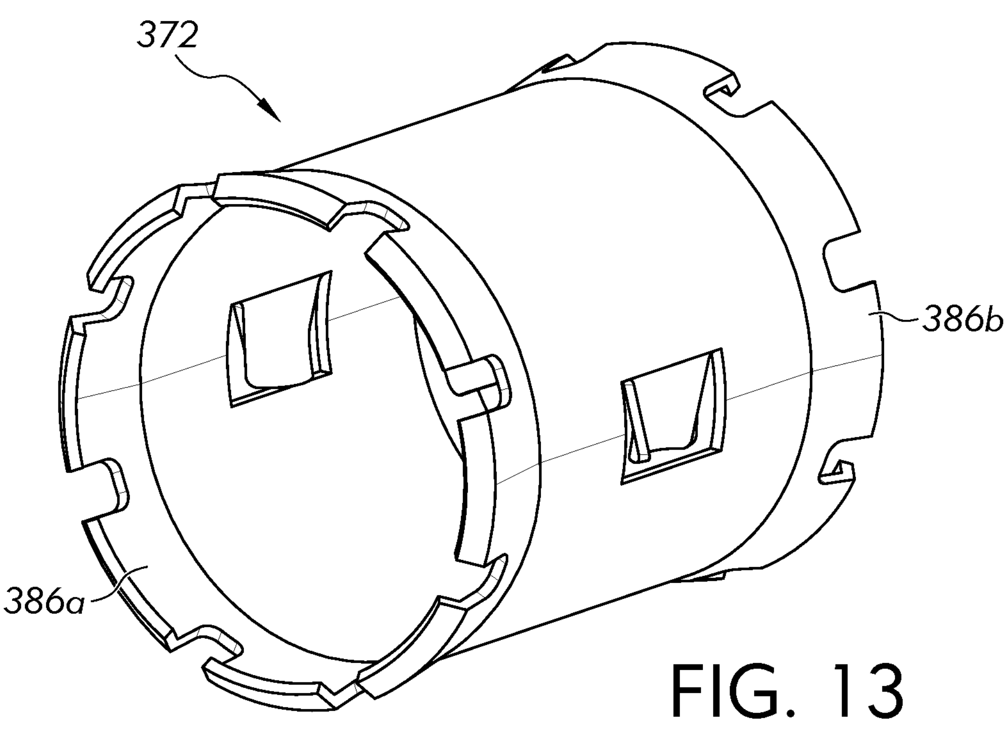
FIG. 13 is a perspective view of a fourth embodiment of an inner sleeve of the compression coupler assembly of FIG. 2.

According to still another embodiment, see FIG. 13, an inner sleeve 372 removes the slit 88. In this embodiment, when the first and second compression nuts 52, 62 (FIG. 7B) are tightened only fingers 386a, 386b flex toward the outer surfaces of the first and second conduits 112, 114 (FIG. 7B).

Figure 14:
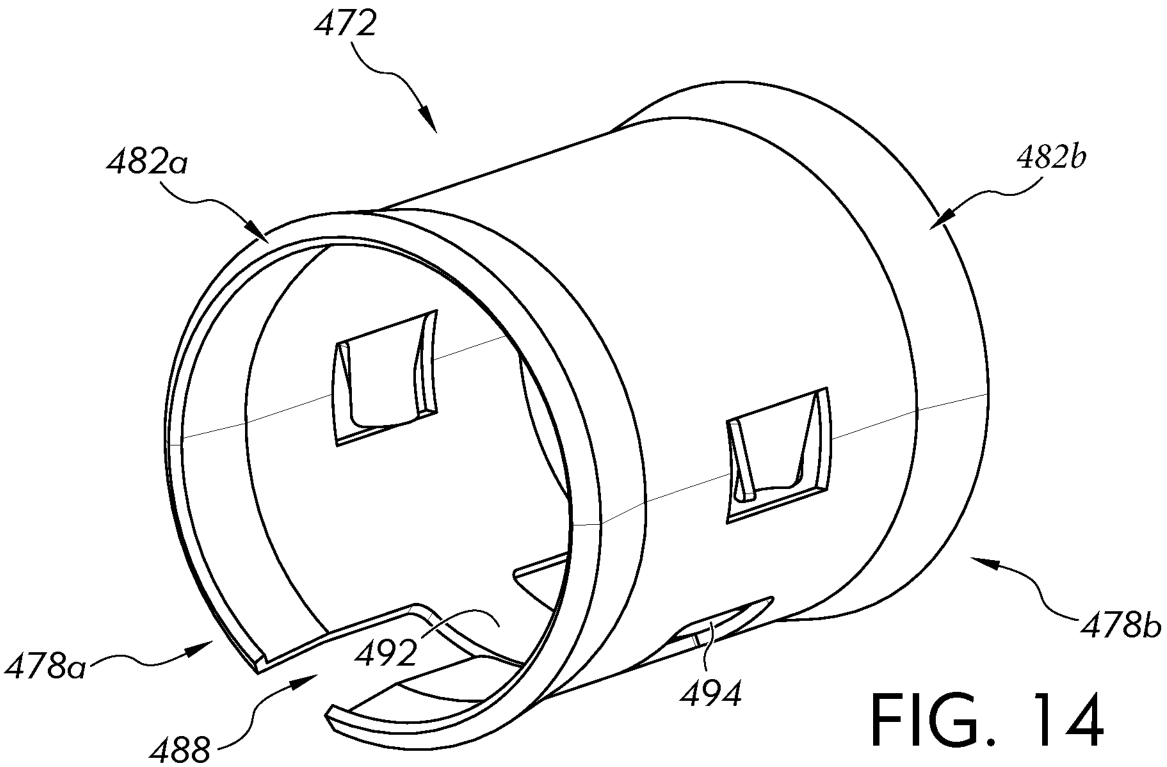
FIG. 14 is a perspective view of a fifth embodiment of an inner sleeve of the compression coupler assembly of FIG. 2.

According to still another embodiment, see FIG. 14, an inner sleeve 472 removes the notches 84 such that first and second ends 478a, 478b of the inner sleeve 472 terminate in sloped flanges 482a, 482b, respectively, that are continuous except for a slit 488 that extends between the first and second ends 478a, 478b. In this embodiment, when the first and second compression nuts 52, 62 (FIG. 7B) are tightened, the flanges 58, 68 (FIG. 7B) of the first and second compression nuts 52, 62 engage the flanges 482a, 482b of the inner sleeve 472, respectively. The movement of the flanges 58, 68 toward each other causes the diameter of the inner sleeve 472 to be reduced. This, in turn, causes the flanges 482a, 482b to clamp around a periphery of the outer surfaces of the first and second conduits 112, 114 (FIG. 7B) while a tongue 492 in one wall of the slit 488 slides into a groove 494 in an opposite wall of the slit 488. The movement of the tongue 492 helps to prevent twisting of the inner sleeve 472 during attachment of the compression coupler assembly 50 to the first and second conduits 112, 114 (FIG. 7B).

Figure 15:
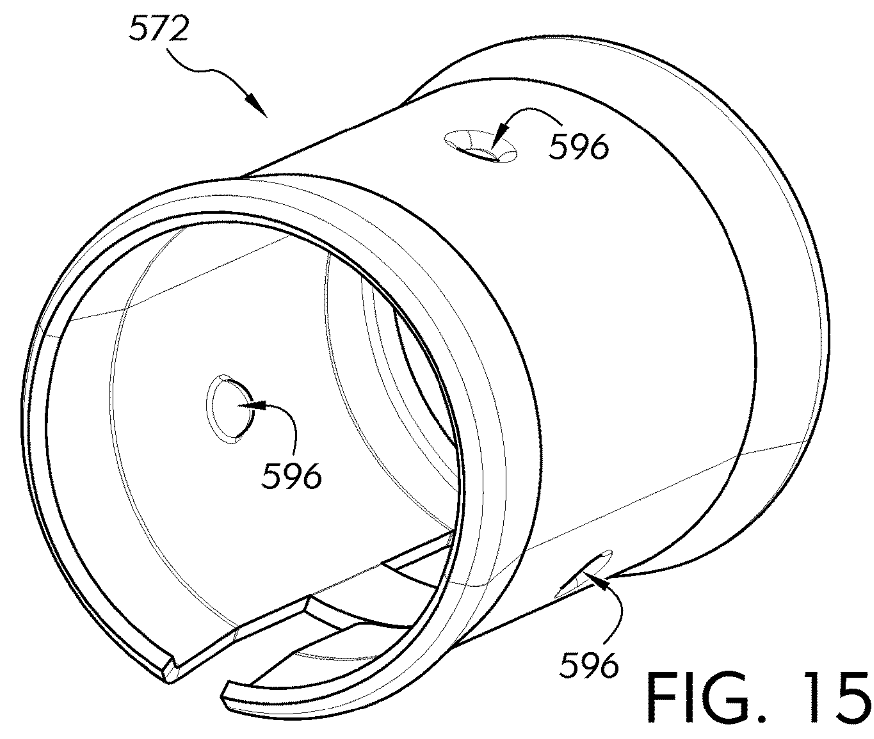
FIG. 15 is a perspective view of a sixth embodiment of an inner sleeve of the compression coupler assembly of FIG. 2.

According to still another embodiment, see FIG. 15, an inner sleeve 572 (similar to the inner sleeve 472) includes three spherical stops 596 that equal spaced around the circumference of the inner sleeve 472. It is contemplated that any number of spherical stops 596 may be formed on the inner sleeve 572.

Figure 16:
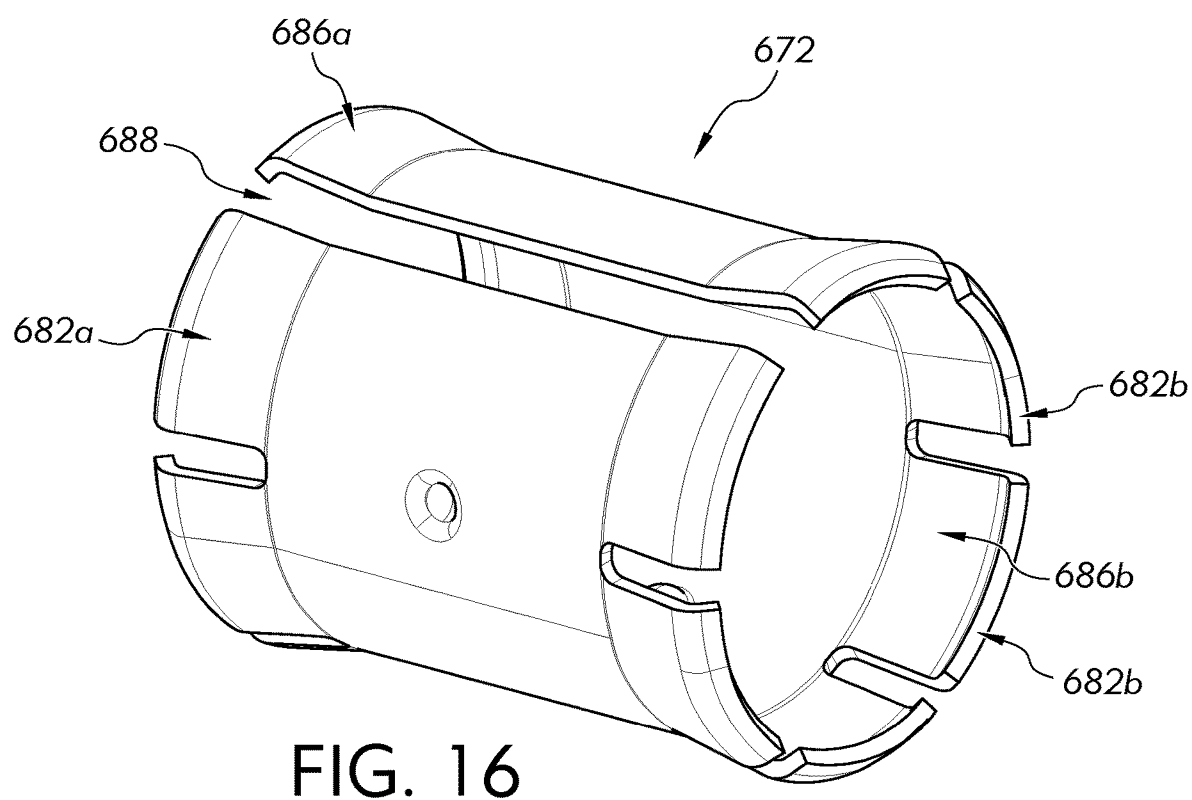
FIG. 16 is a perspective view of a seventh embodiment of an inner sleeve of the compression coupler assembly of FIG. 2.

According to yet another embodiment, see FIG. 16, an inner sleeve 672 includes a slit 688 having a uniform width that extends an entire length of the inner sleeve 672. As the first and second compression nuts 52, 62 are tightened, the flanges 58, 68 (FIG. 7B) of the first and second compression nuts 52, 62 engage flanges 682a, 682b of the inner sleeve 672, respectively. The movement of the flanges 58, 68 toward each other causes the diameter of the inner sleeve 672 to be reduced. This, in turn, causes fingers 686a, 686b to deflect inwardly and clamp around a periphery of the outer surfaces of the first and second conduits 112, 114 (FIG. 7b).

Figure 17:
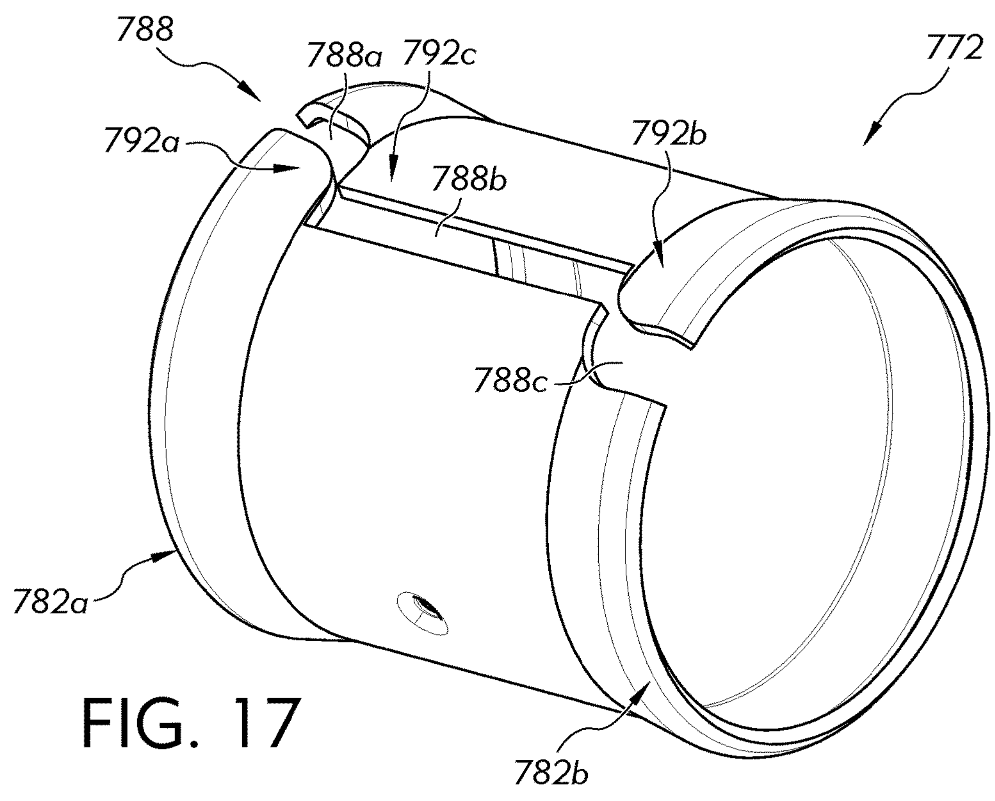
FIG. 17 is a perspective view of an eighth embodiment of an inner sleeve of the compression coupler assembly of FIG. 2.

According to still another embodiment, see FIG. 17, an inner sleeve 772 includes a Z-shape slit 788 with three offset portions 788a, 788b, 788c. The three offset portions 788a, 788b, 788c define a first tongue 792a at a first end of the inner sleeve 772 and a second tongue 792b at an opposite second end of the inner sleeve 772 and a partial third tongue 792c therebetween. In this embodiment, when the first and second compression nuts 52, 62 (FIG. 7B) are tightened, the flanges 58, 68 (FIG. 7B) of the first and second compression nuts 52, 62 engage the flanges 782a, 782b of the inner sleeve 772, respectively. The movement of the flanges 58, 68 toward each other causes the diameter of the inner sleeve 772 to be reduced. This, in turn, causes the flanges 782a, 782b to clamp around a periphery of the outer surfaces of the first and second conduits 112, 114 (FIG. 7B) while the first, second and third tongues 792a, 792b, 792c slide into offset portions 788a, 788c, 788b, respectively, in an opposite wall of the inner sleeve 772. The movement of the tongues 792a, 792b, 792c helps to prevent twisting of the inner sleeve 772 during attachment of the compression coupler assembly 50 to the first and second conduits 112, 114 (FIG. 7B).

Figure 18:
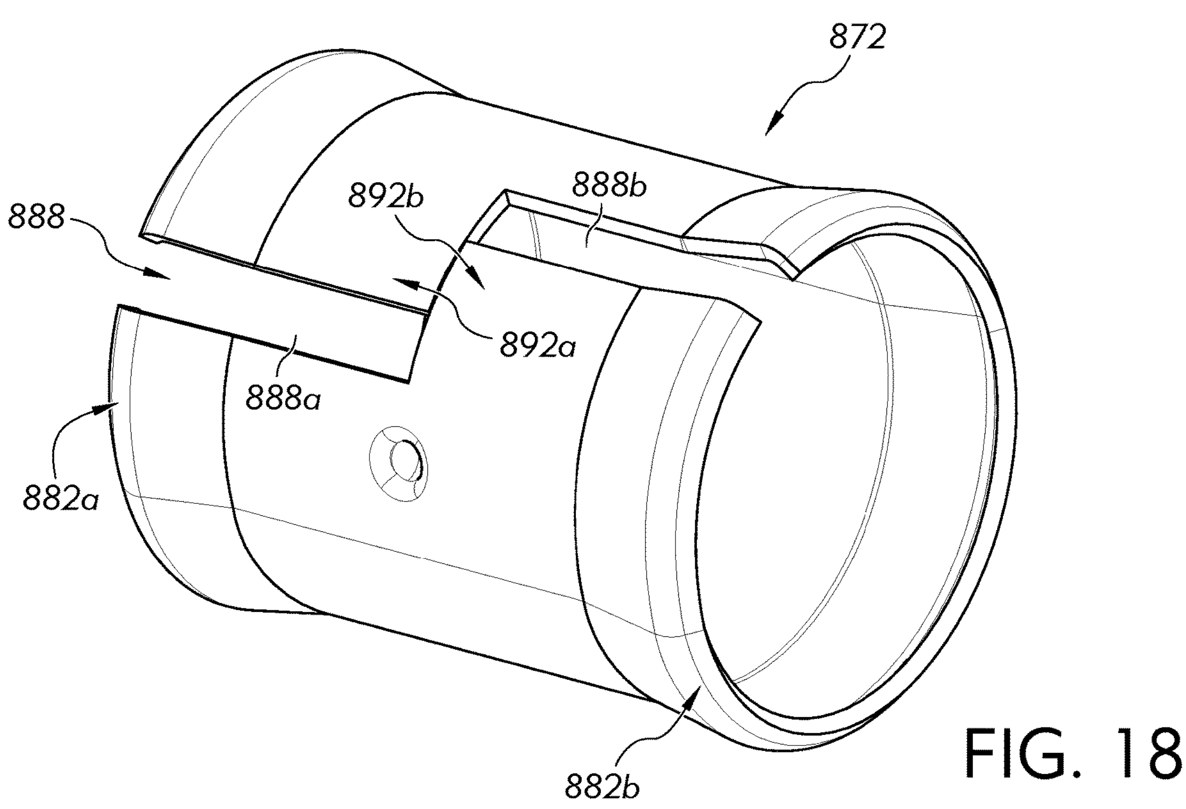
FIG. 18 is a perspective view of a ninth embodiment of an inner sleeve of the compression coupler assembly of FIG. 2.

According to still another embodiment, see FIG. 18, an inner sleeve 872 includes a slit 888 with two offset portions 888a, 888b. The two offset portions 888a, 888b, define a first tongue 892a at a first end of the inner sleeve 872 and a second tongue 892b at an opposite second end of the inner sleeve 872. In this embodiment, when the first and second compression nuts 52, 62 (FIG. 7B) are tightened, the flanges 58, 68 (FIG. 7B) of the first and second compression nuts 52, 62 engage the flanges 882a, 882b of the inner sleeve 872, respectively. The movement of the flanges 58, 68 toward each other causes the diameter of the inner sleeve 872 to be reduced. This, in turn, causes the flanges 882a, 882b to clamp around a periphery of the outer surfaces of the first and second conduits 112, 114 (FIG. 7B) while the first and second tongues 892*a*, 892*b* slide into offset portions 888*a*, 888*c*, respectively, in an opposite wall of the inner sleeve 872. The movement of the tongues 892*a*, 892*b* helps to prevent twisting of the inner sleeve 872 during attachment of the compression coupler assembly 50 to the first and second conduits 112, 114 (FIG. 7B).

Figures 19, 20A, 20B:
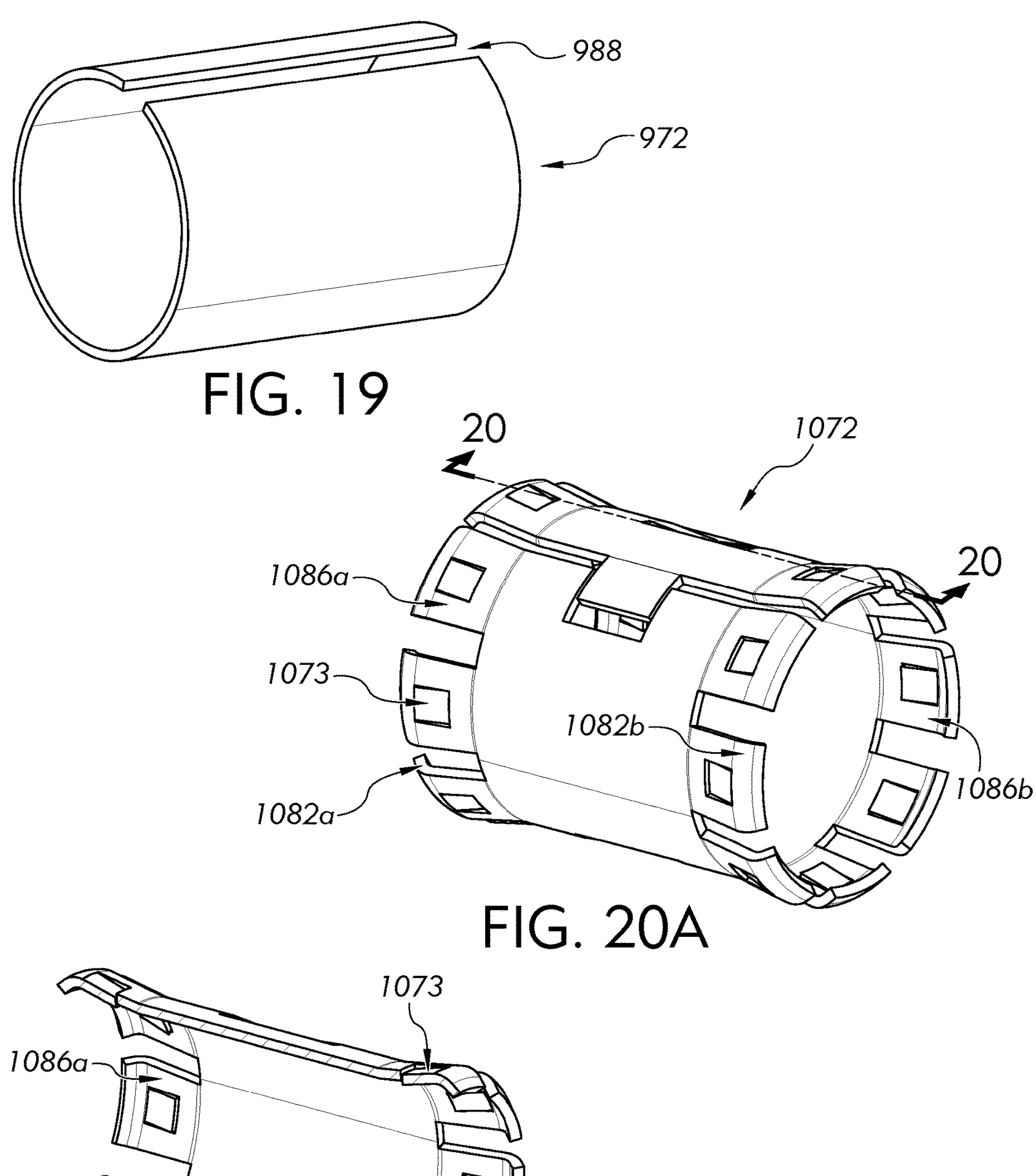
FIG. 19 is a perspective view of a tenth embodiment of an inner sleeve of the compression coupler assembly of FIG. 2.
FIG. 20A is a perspective view of an eleventh embodiment of an inner sleeve of the compression coupler assembly of FIG. 2.
FIG. 20B is a sectioned view taken along line 20-20 of FIG. 20A.

According to yet another embodiment, see FIG. 19, an inner sleeve 972 includes a slit 988 of uniform width that extends an entire length of the inner sleeve 972. In this embodiment, when the first and second compression nuts 52, 62 (FIG. 7B) are tightened, the walls of the inner sleeve 972 on opposite sides of the slit 988 compress on the first and second conduits 112, 114, FIG. 7B).

According to still another embodiment, see FIGS. 20A and 20B, an inner sleeve 1072 includes fingers 1086*a*, 1086*b* wherein each finger 1086*a*, 1086*b* includes a tab 1073 that is formed by deflecting or bending a portion of the finger 1086*a*, 1086*b* inwardly. It is contemplated that all the fingers 1086*a*, 1086*b* may not include a tab 1073. In this embodiment, when the first and second compression nuts 52, 62 (FIG. 7B) are tightened, the flanges 58, 68 (FIG. 7B) of the first and second compression nuts 52, 62 engage the flanges 1082*a*, 1082*b* of the inner sleeve 1072, respectively. The movement of the flanges 58, 68 toward each other causes the diameter of the inner sleeve 1072 to be reduced. This, in turn, causes the flanges 1082*a*, 1082*b* and the tabs 1073 to clamp around a periphery of the outer surfaces of the first and second conduits 112, 114 (FIG. 7B).

Figure 21:
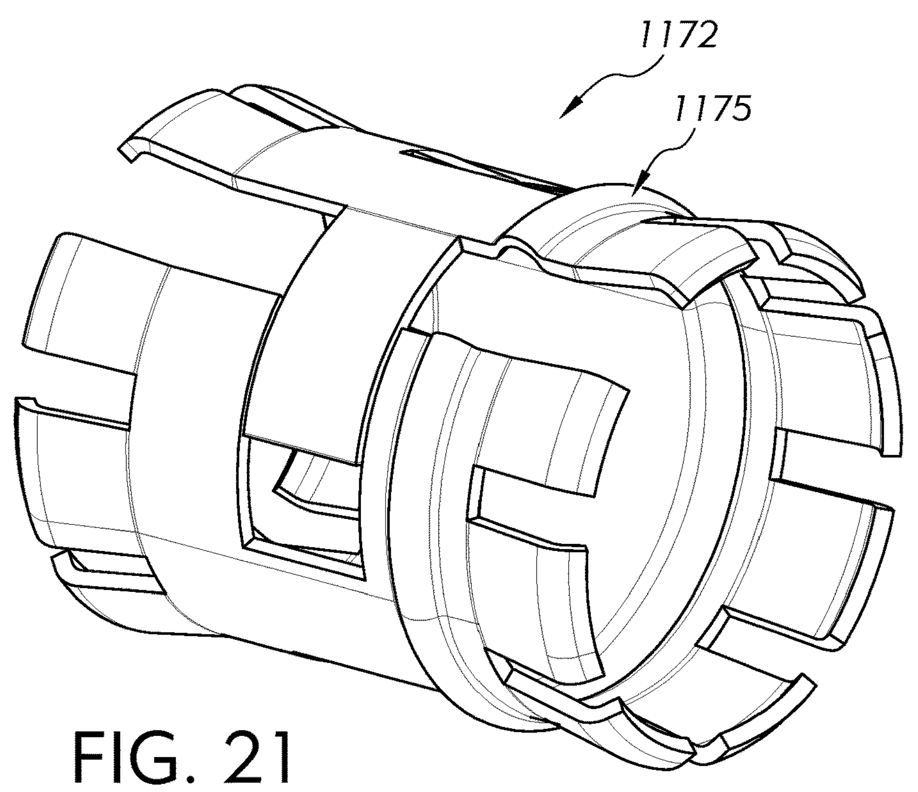
FIG. 21 is a perspective view of a twelfth embodiment of an inner sleeve of the compression coupler assembly of FIG. 2.

According to yet another embodiment, see FIG. 21, an inner sleeve 1172 includes an outwardly protruding groove 1175 that extends circumferentially about the inner sleeve 1172. The inner sleeve 1172 may be dimensioned to receive an o-ring (not shown) for provide additional sealing to one of conduits 112, 114 when the first and second compression nuts 52, 62 (FIG. 7*b*) are tightened on the conduits 112, 114. In the embodiment illustrated, the groove 1175 has a curved lower wall.

Figure 22:
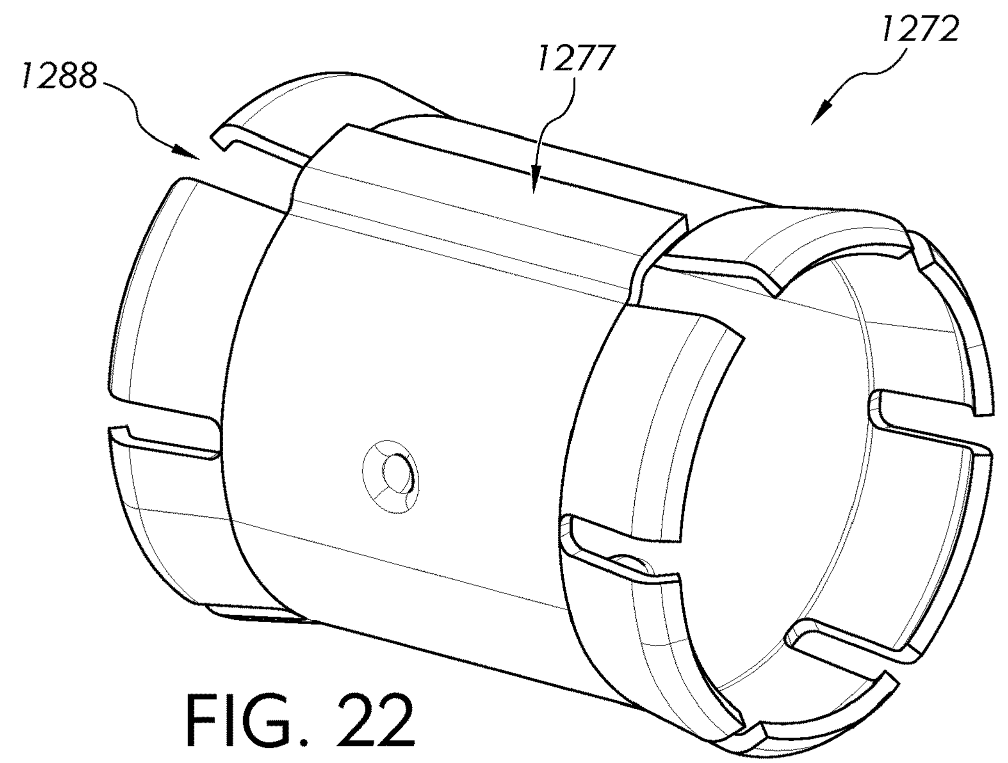
FIG. 22 is a perspective view of a thirteenth embodiment of an inner sleeve of the compression coupler assembly of FIG. 2.

According to still another embodiment, see FIG. 22, an inner sleeve 1272 includes a flap 1277 extending from one edge of the wall that defines one side of a slit 1288. The flap 1277 is dimensioned to overlap an edge of the wall that defines an opposite side of the slit 1288. As the compression nuts 52, 62 (FIG. 7B) are tightened, the flap 1277 slides over the edge of the side wall that defines an opposite side of the slit 1288.

It will be apparent to those skilled in the art that various modifications and variations can be made without departing from the spirit and scope of the claimed invention.

We claim:

1. A compression coupler assembly comprising:
a first compression nut;
a second compression nut threadably attached to the first compression nut; and
an inner sleeve configured to be captured between the first compression nut and the second compression nut when threaded together, the inner sleeve including:
a tubular-shaped body having opposite ends,
a plurality of fingers at the opposite ends of the tubular-shaped body, wherein each of the plurality of fingers is configured to deflect inwardly as the first and second compression nuts are threaded together; and
at least one tab protruding radially inwardly from an inner wall of the inner sleeve, wherein the at least one tab is integrally formed with the wall of the inner sleeve and disposed in an opening formed through the wall of the inner sleeve, the tab being configured to be resiliently deflectable radially outwardly.

2. The compression coupler assembly of claim 1, wherein each of the at least one tab defines a ramp to enable a conduit received in the inner sleeve to engage and slide over the at least one tab and impart radially outward deflection of the at least one tab.

3. The compression coupler assembly of claim 1, wherein each of the at least one tab has an arcuate shape.

4. The compression coupler assembly of claim 1, wherein the tubular-shaped body has a longitudinal slit extending through a wall of the body between the opposite ends of the body.

5. The compression coupler assembly of claim 4, wherein the inner sleeve further includes:
a tongue protruding from an edge of the wall defining one side of the longitudinal slit,
a mating recess formed in an edge of the wall defining an opposite side of the longitudinal slit, wherein the tongue is configured to slide in the mating recess as the first and second compression nuts are threaded together after contacting inwardly slopped flanges, and
an inwardly slopped flange formed at each end of the tubular-shaped body, each inwardly slopped flange configured to deflect inwardly as the first compression nut and the second compression nut are threadably tightened after contacting the inwardly slopped flanges.

6. The compression coupler assembly of claim 1, wherein the mating recess is a groove formed in the opposite edge of the wall.

7. The compression coupler assembly of claim 1, wherein the first compression nut is a female threaded compression nut and the second compression nut is a male threaded compression nut.

8. The compression coupler assembly of claim 1, wherein the inner sleeve further includes an inwardly slopped flange formed at each end of the tubular-shaped body, each inwardly slopped flange configured to deflect inwardly as the second compression nut and the second compression nut are threadably tightened after contacting the inwardly slopped flanges.

9. The compression coupler assembly of claim 8, wherein the tubular-shaped body has a longitudinal slit extending through a wall of the body between the opposite ends of the body, wherein a tongue extends from an edge of the wall defining one side of the longitudinal slit and a groove is formed in an edge of the wall defining an opposite side of the longitudinal slit, the tongue configured to slide in the groove as the first and second compression nuts are threaded together after contacting the inwardly slopped flanges.

10. The compression coupler assembly of claim 8, wherein at least one notch is formed in a distal end of the inner sleeve to divide the flange into the plurality of fingers that are configured to deflect inwardly as the first and second compression nuts are threaded together after contacting the inwardly slopped flanges.

11. The compression coupler assembly of claim 10, wherein the at least one finger includes a tab that is formed by deflecting or bending a portion of the finger radially inward.

12. The compression coupler assembly of claim 1, wherein at least two tabs are formed with the wall of the inner sleeve.

13. The compression coupler assembly of claim 1, further comprising an outwardly protruding groove that extends circumferentially about the body of the inner sleeve, the groove dimensioned to receive an o-ring.

* * * * *